Sept 10, 1957  R. O. AVSEEV  2,805,704
COMBINATION CAR BED AND CAR SEAT FOR INFANTS
Filed July 21, 1954  2 Sheets-Sheet 1

INVENTOR.
RALPH O. AVSEEV
BY
Lindsey and Pritzman
ATTORNEYS

Sept 10, 1957      R. O. AVSEEV      2,805,704
COMBINATION CAR BED AND CAR SEAT FOR INFANTS
Filed July 21, 1954      2 Sheets-Sheet 2

INVENTOR.
RALPH O. AVSEEV
BY
*Lindsey and Prutzman*
ATTORNEYS

United States Patent Office 2,805,704
Patented Sept. 10, 1957

2,805,704

COMBINATION CAR BED AND CAR SEAT FOR INFANTS

Ralph O. Avseev, Hartford, Conn.

Application July 21, 1954, Serial No. 444,871

5 Claims. (Cl. 155—44)

This invention relates to a convertible combination car bed and car seat for infants.

One object of the invention is to provide a combination car bed and car seat which is substantially simplified in construction in comparison with the prior art and which is relatively inexpensive to manufacture.

Another object is to provide a combination car bed and car seat of substantially foolproof construction which is particularly suitable for simple and easy conversion and reconversion for use as either a car bed, a portable crib, a car seat, or to support an infant in a standing position.

Another object is to provide a combination car bed and car seat which accommodates and supports an infant comfortably and securely in either a reclining, sitting or standing position, and therefore affords a practical, economical and space-saving arrangement for comfortably accommodating an infant during both sleeping and waking hours.

Another object is to provide a device of the character described which is sturdy and durable, and is suitable for continuous service for long periods without requiring repair or adjustment.

Another object is to provide a combination car bed and car seat which is adapted to be readily folded into a small and compact package for convenient stowage when not in use.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
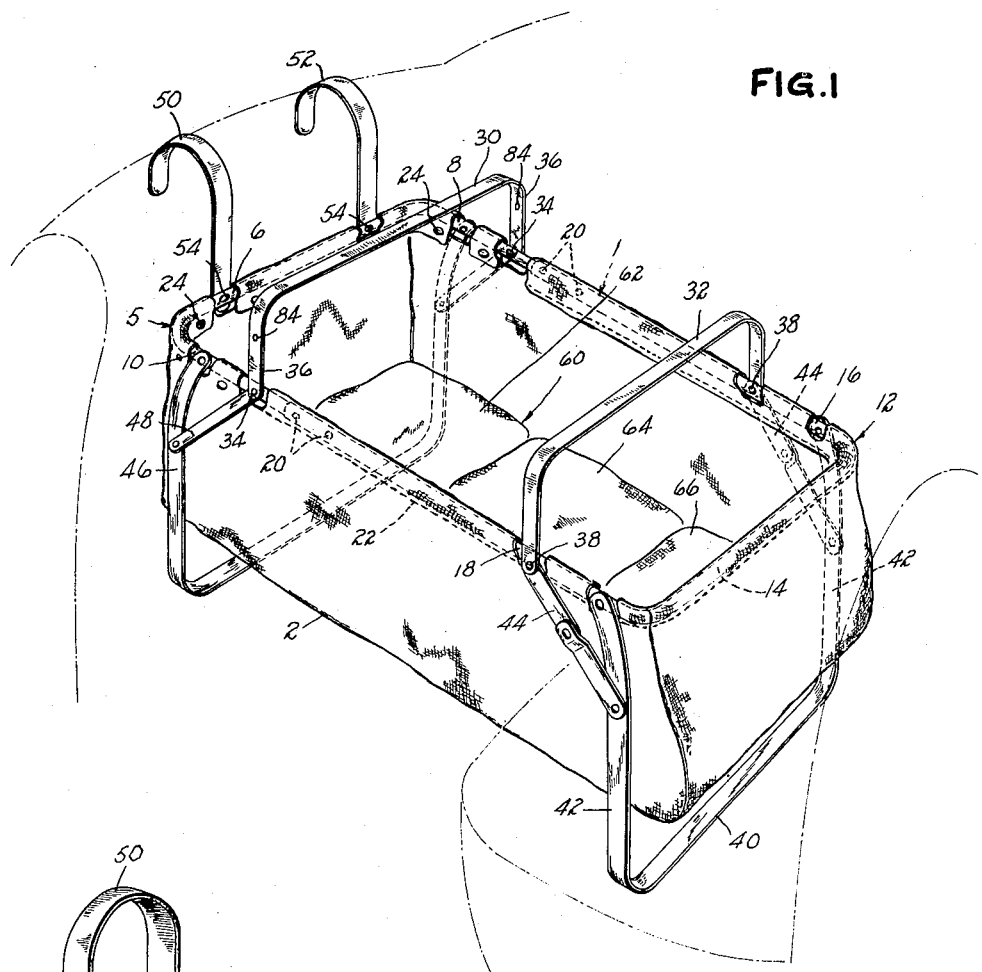
Figure 1 is a perspective view of a combination car bed and car seat constructed in accordance with the present invention, and arranged for use as a car bed.
Figure 2:
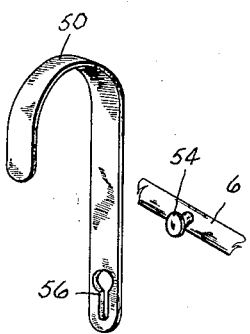
Figure 2 is an enlarged perspective view of a portion of the structure shown in Figure 1.

Referring to the drawings, and particularly Figure 1 thereof, a combination car bed and car seat constructed in accordance with the present invention includes a rectangular frame 1 from which is suspended an oblong bag or tub 2 of canvas or other pliant material of the proper size to accommodate an infant securely and comfortably in a reclining position. The frame is arranged so that it can be disassembled, and for this purpose is constructed in two sections. The frame consists of a U-shaped front section 5 having a transverse member 6 and side members 8, 10, and a U-shaped back section 12 having a transverse member 14 and side members 16, 18. In the preferred embodiment, the front frame section 5 and the back frame section 12 are fabricated from tubular stock of respective diameters such that the ends of the sides 8 and 10 of the front frame may be inserted into the ends of the sides 16 and 18 respectively of the back frame. The forward ends of side members 16, 18 thus are adjustable lengthwise on the rearward ends of side members 8, 10, the connection being removably secured by fasteners such as bolts 20 which engage aligned openings in the sides of the frame sections and may be secured with knurled nuts or the like. With this arrangement the front and back frame sections can be readily disconnected by merely disconnecting fasteners 20 and pulling the frame sections apart. The rear frame section is approximately twice as long as the front section, so that the two sections are connected at a point about one-third the length of the frame from its front end.

The upper marginal edge of the bag 2 is permanently secured to the rear frame section 12 by stitching 22 and is folded or looped over the front section 5 of the frame and removably secured thereto by fasteners 24, such as snap fasteners, buttons or the like. With this arrangement the entire bag 2 and back frame section 12 can be readily detached and removed from the front frame section when converting the apparatus for use as a car seat, as will hereinafter be described.

To enable the apparatus to be conveniently carried by hand, the frame is provided with a pair of transverse U-shaped carrying handles 30, 32. The front carrying handle 30 is pivotally connected by rivets 34 to the midpoints of the side members 8, 10, the upper edge of the bag 2 being relieved at these points to accommodate these connections. The sides 36 of handle 30 are preferably about one-half the length of the side members 8, 10 so that the handle can fold down forwardly adjacent transverse member 6 or when folded rearwardly will bridge the rearward ends of side members 8, 10. A similar rear carrying handle 32 is pivotally connected by rivets 38 to side members 16, 18 at points properly spaced from transverse member 14 so that when folded down rearwardly the transverse portion of the handle 32 will lie adjacent the transverse member 14.

Pivotally connected to the side members 16, 18 adjacent the back end of the frame is a U-shaped strap 40 forming a pair of back legs 42 by which the back end of the frame may be supported on the rear seat of an automobile or other horizontal surface. The legs 42 are arranged to fold up against the frame and are supported in extended position by foldable braces 44 connected between intermediate points on the legs and rivets 38. At the front of the frame is a similar pair of legs 46 pivotally connected to said members 8, 10 and supported by braces 48. The front and rear legs are of sufficient length to support the bag or tub in elevated position with its bottom clear of any supporting surface.

To support the front end of the frame from the back of an automobile front seat, a pair of J-shaped hook members 50, 52 is removably connected to transverse member 6 by the engagement of the enlarged heads of studs 54 on transverse member 6 with keyhole-shaped slots 56 in the bottom ends of the hooks.

Figure 3:
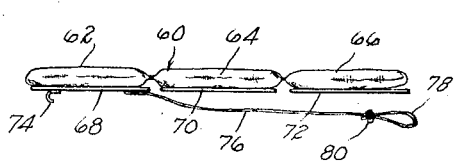
Figure 3 is a view to a diminished scale of the mattress portion of the apparatus of Figure 1.

The car bed is provided with a mattress 60 consisting of padding material, such as kapok, enclosed in a suitable envelope of plastic or the like. To permit the mattress to be easily folded, it is divided into three connected sections 62, 64, 66, each of which is approximately as wide as bag 2 and approximately one-third its length. As shown in Figure 3, the sections of padding material are reinforced by rigid panels 68, 70, 72 of hardboard or the like suitably secured to the bottom of the bedding sections 62, 64, 66 respectively.

Secured to the rigid panel 68 adjacent its outer end is a pair of transversely spaced hangers 74 which are adapted to fit over the transverse member 6 of the front frame section when the apparatus is converted for use as a car seat. Adjacent the center of the inner edge of panel 68 is secured one end of a strap 76 having at its other end a loop 78 closed by a snap fastener 80. Centrally disposed along the fold line between the front mattress section 62 and the middle section 64 is a slot 82 wide enough for strap 76 to be threaded through it.

In use of the apparatus as a car bed, as may be seen in Figure 1, the front end of the frame is supported from the back of an automobile front seat by the hooks 50, 52 and the rear end of the frame is supported on the rear end of the automobile seat by the rear legs 42. The mattress is unfolded to its full length and covers the bottom of the bag 2 so as to provide a surface which is flat and relatively rigid, yet comfortably padded, for supporting an infant in a reclining position. The carrying handles 30, 32 may be folded down flat against the ends of the frame so that unobstructed access may be had to the interior of the bag 2.

To convert the car bed for use as a portable crib or bassinet, the hooks 50, 52 may conveniently be detached by disengaging studs 54 from keyhole slots 56 and the bed may then be supported in a stable and horizontal condition on its front legs 46 and back legs 42.

Figure 4:
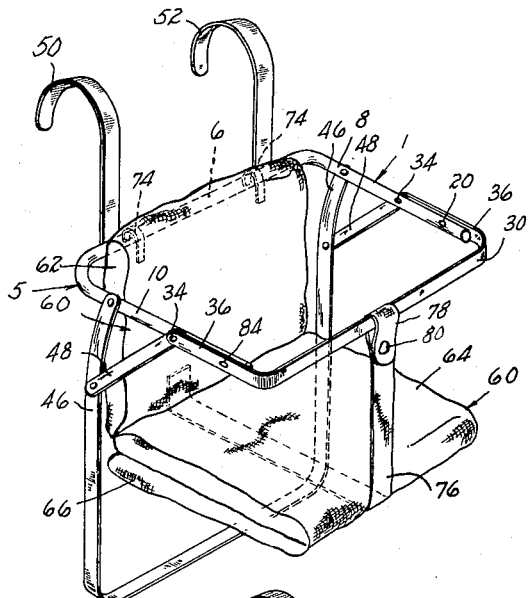
Figure 4 is a perspective view of the combination apparatus converted for use as a car seat.

To convert the apparatus to a car seat, a front end of the bag 2 is unsnapped from the front section 5 of the frame, fasteners 20 are disengaged at the connecting joint of the frame sections, and then the entire bag 2 and rear frame section are removed from the front frame section. The front carrying handle is then folded down as shown in Fig. 4 so as to bridge the space between the rear ends of the side members 8, 10, and is secured in this position by the engagement of fasteners 20 with registering openings 34 in the handle. The mattress is removed from the bag 2 and arranged to provide a back portion and a seat portion for the car seat by suspending panel 62 from transverse member 6 by means of hangers 74, folding the other end section 66 of the mattress beneath the middle section 64, and passing the free end of the strap 76 beneath the folded sections of the mattress and looping it over the middle of the front carrying handle 30, as shown in Figure 4. The car seat is supported by the hooks 50, 52 from the top of an automobile seat in the usual manner, and the front legs 46 lie against the vertical surface of the automobile seat and support the front frame section and the front carrying handle in a substantially horizontal plane. With this arrangement the folded mattress sections 64, 66 provide a flat, relatively rigid and comfortably padded seating surface, and the upright mattress section 62 provides a comfortable back rest for an infant in a seated position. The front carrying handle 30 prevents the infant from falling forward out of the seat, and the strap is centrally positioned so that it will normally extend between the legs of the infant and prevent the infant from sliding forward off the seat.

Figure 5:
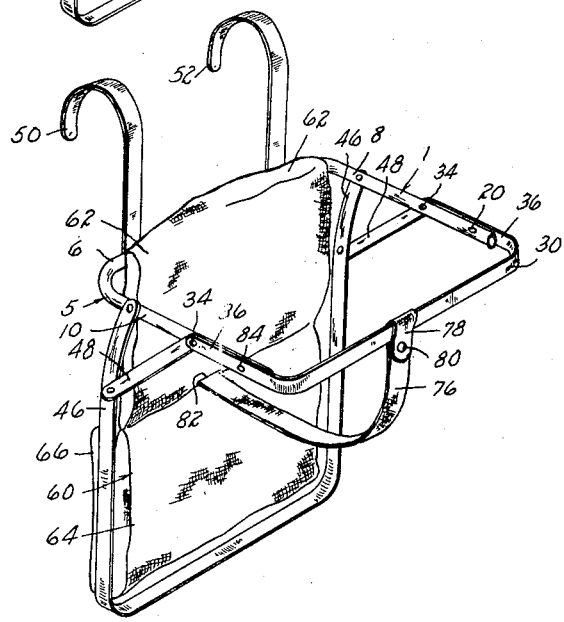
Figure 5 is a view corresponding to Figure 4 but with the apparatus converted to support an infant in a standing position.

To convert the apparatus for supporting an infant in a standing position, the strap 76 may be threaded through the slot 82 between the end section 62 and center section 64 of the mattress and looped over the front carrying handle 30. The center and other end section 66 of the mattress may then be folded downwardly and rearwardly as shown in Figure 5. With this arrangement an infant in a standing position is supported securely and safely, the strap 76 extending between the legs of the infant and preventing his slipping downwardly, and the handle 30 and frame sides 8 and 10 preventing the infant from falling forward or sideways.

It may thus be seen that the present invention provides a combination car bed and car seat which can be converted quickly, easily, and in a substantially foolproof manner for use as a car bed, crib, car seat, or stand-up support. The apparatus provides comfortable and secure accommodations for an infant in a reclining, sitting or standing position, and therefore affords a practical and economical arrangement which fully satisfies all the requirements of an infant for comfortable accommodations during either waking or sleeping hours. Also, since a substantial number of the parts of the device serve different purposes in the several different arrangements of the apparatus, it will be appreciated that the present invention provides a substantially simplified structure affording many economies in material and in cost of fabrication and assembly.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therein.

I claim:

1. A car bed for infants comprising a rectangular frame including a U-shaped front frame section and a U-shaped back frame section connected thereto, a U-shaped bar pivotally connected to said front frame section and movable into bridging relation with the ends thereof, legs pivotally connected to said front frame section and to said back frame section, a rectangular bag constructed to accommodate an infant in reclining position, fastening means detachably securing one end of said bag to said front frame section, the other end of said bag being secured to said back frame section, a mattress in said bag, said mattress having a plurality of transversely foldable sections, hooks connected to said front frame for supporting said frame from an automobile seat, and means to convert said car bed into a car seat comprising means to selectively disconnect said U-shaped frame sections to permit said back frame section and said bag to be detached as a unit from said front frame section, hangers attached to one of said mattress sections for securing said one mattress section to said front frame section to form an upright back supporting surface when the bag and back frame section are removed, and means attached to the mattress and engageable with said bar for horizontally supporting another mattress section from said bar to form a seating surface.

2. A car bed for infants comprising a rectangular frame including a pair of interconnected U-shaped frame sections, a pair of legs pivotally connected to one of said frame sections, a bag constructed to accommodate an infant in reclining position permanently attached at one end to the other of said frame sections, a pair of legs connected to said other of the frame sections, fastening means detachably securing the other end of said bag to said one frame section, a pair of hook members detachably connected to said one frame section and constructed to be engageable with the top of an automobile seat, a mattress in said bag, said mattress having a plurality of transversely foldable sections, a stiff reinforcing panel attached to each mattress section, and means to convert said car bed into a car seat comprising means to selectively disconnect said U-shaped frame sections to permit said other frame section and said bag to be detached as a unit from said one frame section, a U-shaped bar pivotally mounted on said one frame section and constructed for movement into bridging relationship with the ends of said one frame section, hangers attached to one of said mattress sections for securing said one mattress section to said one frame section to form an upright back supporting surface, and a strap attached to the mattress and engageable with said bar for horizontally supporting another mattress section from said bar to form a seating surface.

3. A combination car bed and car seat apparatus comprising a frame including a rearwardly facing U-shaped front frame section connected to a forwardly facing U-shaped back frame section, a rectangular bag supported at its upper marginal edge by said frame and constructed to accommodate an infant in a reclining position, a mattress in said bag transversely foldable in three sections and including an individual rigid reinforcing panel attached to each mattress section, a pair of transversely spaced legs pivotally connected to each of said frame sections, hook members engageable with said front frame section for supporting said front frame section from the top of an automobile seat, and means to convert said apparatus from a car bed to a car seat comprising means to selectively disengage said back frame section and said bag as a unit from said front frame section, a U-shaped carrying handle pivotally connected centrally of the sides of said front frame section and foldable into the plane of said front frame section to bridge the rearward ends of the sides thereof, hangers on one end mattress section engageable with said front frame section to suspend said one end mattress section in an upright position, and a strap connected to said mattress and engageable with said carrying handle to support the other mattress sections in folded horizontal extending relation.

4. A combination car bed, car seat and stand-up support apparatus comprising a rectangular bag constructed to accommodate an infant in a reclining position, a frame supporting said bag from its upper marginal edge including a rearwardly facing U-shaped front frame section connected to a forwardly facing U-shaped back frame section, said back frame section being permanently secured to one end of said bag, a pair of transversely spaced legs connected to each of said frame sections, hook members engaged with said front frame section and constructed to support said apparatus from the top of an automobile seat, a mattress in said bag transversely foldable into three sections and including an individual rigid reinforcing panel attached to each mattress section, means to selectively disconnect said back frame section and said bag as a unit from said front frame section when it is desired to convert the apparatus from a car bed to a car seat including manually disengageable fasteners distributed along the upper marginal edge of said bag detachably connecting the other end of the bag to the front frame section, hangers connected to one end mattress section and engageable with said front frame to suspend said one end mattress section in an upright position when the bag and back frame section are removed, a U-shaped carrying handle pivotally connected to the sides of said front frame section and foldable into the plane of said frame section to bridge the rearward ends of the sides thereof, and a strap connected to said one end mattress section and detachably engageable with said carrying handle, and means to convert said apparatus into a support for a standing infant upon removal of said back frame section and said bag from said front frame section comprising means forming a slot between said one end mattress section and the center mattress section, said slot being constructed to receive said strap.

5. A combination car bed, car seat and stand up support apparatus comprising a supporting frame including a U-shaped front frame section connected to a U-shaped back frame section, both of said frame sections having circular cross sections of respective diameters such that the sides of said front frame section are insertable within the ends of the sides of said back frame section, a rectangular bag constructed to accommodate an infant in a reclining position and being supported from said frame with one end of said bag permanently attached to said back frame section, a mattress in said bag transversely foldable into three sections and including an individual rigid reinforcing panel attached to each mattress section, a pair of transversely spaced legs pivotally mounted on each of said frame sections, a pair of studs on said front frame section spaced transversely thereof, a hook member having a keyhole slot at its lower end removably engaged with each of said studs, the upper end of said hook member being constructed to be supported by the top of the back of an automobile seat, means to convert said apparatus from a car bed to a car seat comprising means to selectively disconnect said back frame section and said bag as a unit from said front frame section including manually disengageable fasteners distributed along the upper marginal edge of said bag detachably connecting the other end of the bag to the front frame section, a pair of hangers on one end mattress section constructed to be engaged with said front frame section when the bag and back frame section are removed to support said one end mattress section in an upright position, a U-shaped carrying handle pivotally connected to the sides of said front frame section at the mid-point thereof, and a strap connected at one end to said one end mattress section and having a fastener at its other end constructed to detachably secure said other end of the strap to said carrying handle, and means to convert said apparatus into a stand-up support upon removal of said back frame section and said bag from said front frame section comprising means forming a slot disposed transversely of said mattress between said one end mattress section and the adjoining center mattress section, said slot being constructed to receive said strap when said other end of the strap is secured to said carrying handle.

References Cited in the file of this patent

UNITED STATES PATENTS

| | | |
|---|---|---|
| 2,488,225 | Mover | Nov. 25, 1949 |
| 2,533,527 | Soltis | Dec. 12, 1950 |
| 2,551,509 | Smith | May 1, 1951 |